United States Patent Office 3,149,847
Patented Sept. 22, 1964

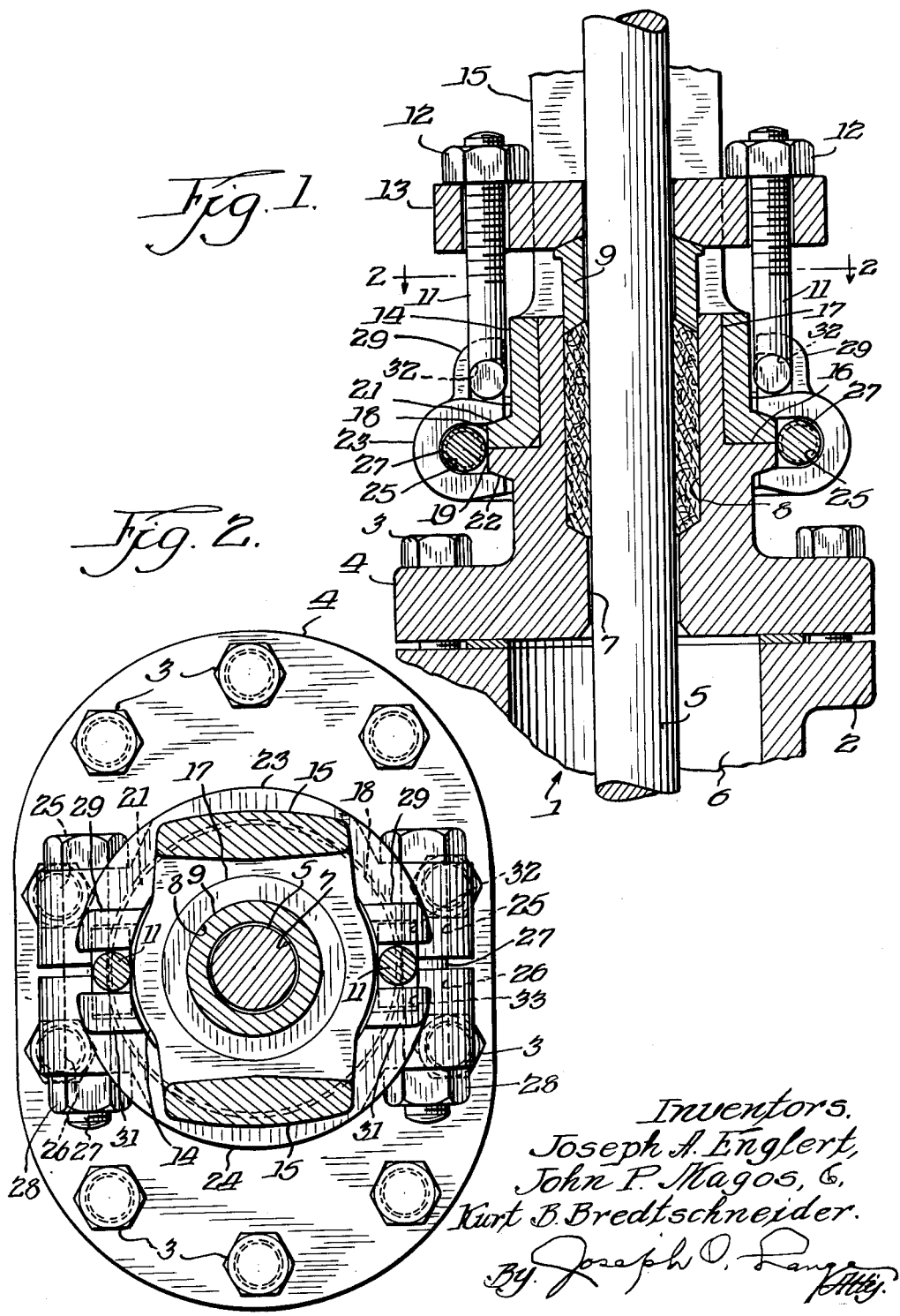

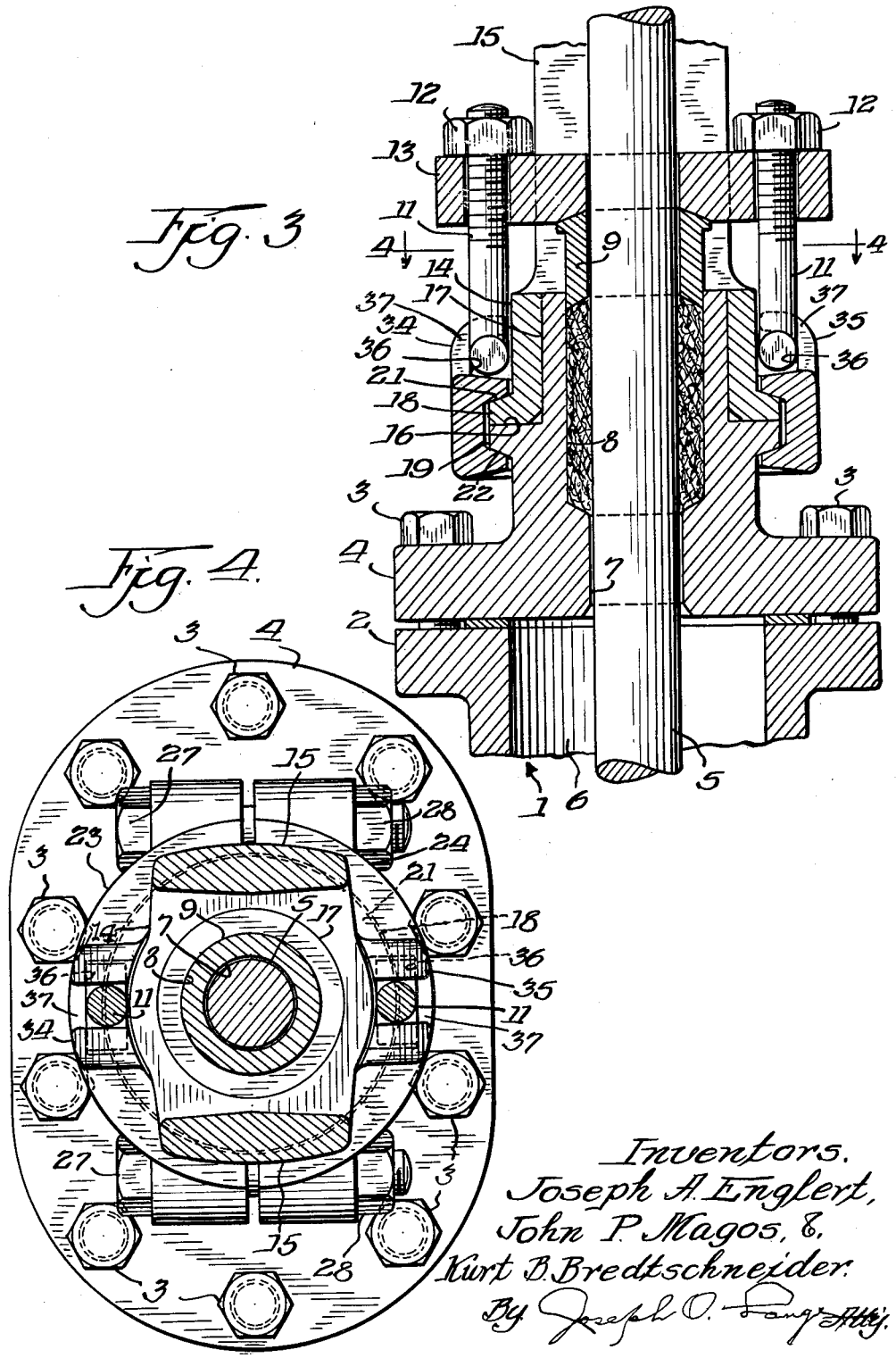

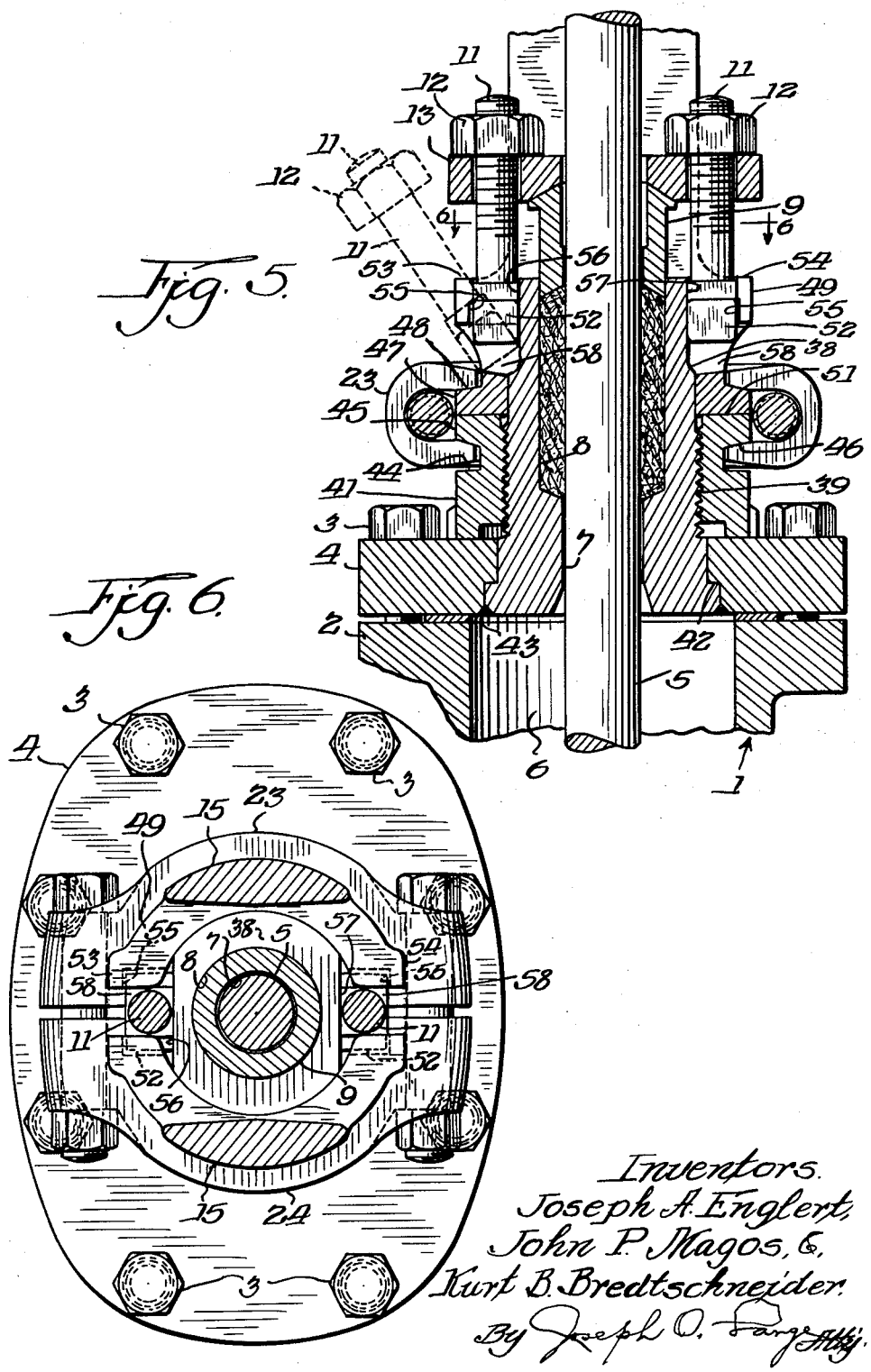

---

3,149,847
STUFFING BOX T-BOLT LUG ARRANGEMENT
FOR VALVES
Joseph A. Englert, Chicago, John P. Magos, Wilmette, and Kurt B. Bredtschneider, Chicago, Ill., assignors to Crane Co., Chicago, Ill., a corporation of Illinois
Filed May 31, 1963, Ser. No. 284,701
8 Claims. (Cl. 277—105)

This invention relates to a split clamp construction for gland bolts and stuffing boxes and, more particularly, it is concerned with the type of construction suitable not only for valves, but also for other types of pressure vessels, such as pumps or the like, in which a reciprocating or rotating or a combined reciprocating-rotating shaft is employed in a leakproof mounting or bearing.

At the outset, in order to have a better appreciation of the inventive concept involved here, it should be understood that in the compressing of the packing and stuffing box, frequently, the latter are tightened by means of ring nuts or a gland flange employing stud bolts or eye bolts to compress the packing. The objection to such designs, particularly where ring nuts are employed, is the expense in repairing a damaged stuffing box, and further, the excessively high force required, necessitating the use of large wrenches. The latter are necessarily difficult to handle because generally speaking, the space between the yoke arms is relatively restricted.

A further objection to the use of the more easily retained eye bolt designs lies in the fact that the ears for the eye bolts usually positioned on the bonnet or on the yoke are difficult to cast and the drilling for eye bolt pins necessitates an extra machining operation involving the use of costly drilling features.

A further objection to the prior constructions lies in the fact that the conventional eye bolt designs previously employed do not permit of mounting the gland bolts sufficiently close to the stem central axis and thus keep the bending moment on the bonnet flange to a minimum, as well as maintaining flange dimensions to a desirable minimum proportion.

A further objection to prior construction lies in the fact that the eye bolt pins in the course of service frequently become loosened and the gland bolts are then lost or dropped into inaccessible areas during the packing of the stuffing box. Accordingly, it is an important object of this invention to provide a gland and stuffing box construction in which the inverted T-bolts employed therefor are beneficially positioned so as to be incapable of becoming loosened and lost.

A further object is to provide for a gland T-bolt mounting in which the said bolt is securely received upon the same means employed for tightening a split clamp or coupling and holding the latter member together during valve assembly.

Another object providing for greater compactness in the positioning of the gland T-bolts lies in devising a novel yoke construction in which the T-bolts are securely positioned within a recessed portion of a wall of the said yoke.

Another object is to provide for a gland T-bolt construction in which the said T-bolts are mounted in pockets between the clamp split portion so that as the clamp bolts draw the split clamp together in effecting the mounting of the yoke to the stuffing box the T-bolts are secured in said pockets.

In a further modification, the T-bolts are received in oppositely disposed pockets formed on side peripheral portions of the split clamp portions.

A further object is to provide for a gland T-bolt construction in which the T-bolts are inserted in cavities formed in the yoke before the clamp is assembled in place on the yoke and cannot be removed except upon removal of the split clamp bolt coupling.

Other objects and advantages will become more readily apparent upon proceeding with the following description read in light of the accompanying drawings, in which:

FIG. 1 is a fragmentary sectional assembly view of a preferred embodiment of our invention;

FIG. 2 is a sectional assembly view taken on the line 2—2 of FIG. 1;

FIG. 3 is a fragmentary sectional assembly view of a modified form of the invention;

FIG. 4 is a sectional assembly view taken on the line 4—4 of FIG. 3;

FIG. 5 is a sectional assembly view of a further modified form of the invention;

FIG. 6 is a sectional assembly view of our invention taken on the line 6—6 of FIG. 5.

Similar reference numerals refer to similar parts throughout the several views.

Referring now to FIG. 1, the bonnet end portion of a pressure vessel generally designated 1, such as a valve body, for example, is provided with the connecting bonnet or cover flange 2 connected by means of a plurality of bolts 3 to a bonnet or cover member 4.

A valve stem or pump shaft as the case may be as indicated at 5 projects from the chamber 6 through the bonnet 4 as by means of the aperture 7, the latter opening communicating with the stuffing box defined as at 8 within which the gland 9 enters in the usual manner of a stuffing box gland to compress the packing indicated therewithin. In this construction, the said stuffing box is preferably made integral with the bonnet 4.

For the purpose of compressing said packing, the oppositely disposed T-bolts 11 are employed, having the usual cooperating tightening nuts 12 bearing as indicated against the gland flange 13 to bear upon the gland 9 as illustrated. The yoke member 14 having the usual oppositely disposed arms 15 as shown more clearly in FIG. 2 is joined to the bonnet 4 in the manner hereinafter to be described so as to be supported upon the annular surface 16 and snugly engages the hub portion 17 of the bonnet 4 as indicated, whereby to align the said yoke member with the bonnet 4.

It is to be noted that the immediate adjoining portions of the yoke and bonnet as at 18 and 19 respectively are of flanged configuration, having thereon the rear surface portions as at 21 and 22 annularly inclined as indicated so as to receive a split clamp consisting of the oppositely disposed halves 23 and 24 as more clearly shown in FIG. 2. Each of the said halves of the clamp is transversely apertured as at 25 and 26 (see FIG. 2) to receive the through bolts or studs 27 and are retained by means of the tightening nuts 28 so as to draw the respective half clamp portions 23 and 24 snugly over the respective annularly inclined surfaces 21 and 22 to make the firm shoulder contact at the surface 16.

It will be noted as more clearly shown in FIG. 1 that in substantially oppositely disposed position thereon, each of the half clamp portions 23 and 24 is provided with the hollow lugs 29 and 31 respectively to receive the T-portion of the bolts 11 as also shown in FIG. 2, the T-head portions of the bolts spanning the clearance normally existing between the assembled clamp halves 23 and 24 as shown in FIG. 2. It will be apreciated that immediately prior to the assembly of the clamp half portions 23 and 24 to join the yoke and bonnet, the T-bolts 11 are inserted into the respective cavities or space portions indicated at 32 and 33, thereby establishing the position of the gland bolts in respect to the gland flange 13.

The advantage of the construction herein described lies in that upon loosening and removing the gland nuts 12 and moving the gland flange 13 upwardly away, the T-bolts 11 can easily be swivelled outwardly relative to the stuffing box. Upon lifting the gland 9 and the flange 13 to the desired axial position, the stuffing box 8 can then be either repacked or replenished as required. Thus, the construction possesses the highly desirable advantage that the T-bolts 11 will permit of such repacking or replenishment without danger of gland bolt displacement and loss during the packing operation.

Referring now to the modified form of the invention shown in FIGS. 3 and 4 in which the attachment of the yoke to the stuffing box and the clamping to the bonnet is similar to that described in connection with FIGS. 1 and 2, it will be noted that the hollow lugs integrally formed on each of the clamp halves 23 and 24 are cast on the back annular portion of the respective clamp halves 23 and 24 rather than at the juncture where the clamp halves are joined together by means of the bolts 27 as described in connection with FIGS. 1 and 2. In this construction, the T-bolts 11 are mounted within the integral lugs 34 and 35 and it will be appreciated that the T-bolts 11 must be assembled within the recess 36 before the clamp bolts 27 and the nuts 28 are drawn together in attaching the respective clamp halves 23 and 24 upon the flanges 18 and 19 as shown more clearly in FIG. 3 to bear against the respective annular inclined surfaces 21 and 22.

The benefit gained in the instant improved modified construction lies in the fact that the clamp halves at their juncture permit of convenient accessibility, repair or replacement of the gland T-bolts 11.

It will be apparent that upon loosening and separating the clamp halves 23 and 24, said T-bolts can easily be removed from the respective recesses 36 by moving them inwardly or in a direction toward the yoke 14 of the valve. As described in the earlier construction, the T-bolts can be swung arcuately through the space 37 and outwardly beyond the gland flange upon removal of the nuts 12 and movement upwardly of the gland flange 13. In all other respects, the modified construction is generally similar to that described in connection with FIGS. 1 and 2. Therefore, the details of such construction are not repeated, but bear similar numerals where the parts are similar.

Referring now to a further modification shown in FIGS. 5 and 6, it will be appreciated that in some cases, notwithstanding the employment of a split clamp construction as at 23 and 24, an independent member may be employed upon which to conveniently mount a square head type of T-bolt such as that illustrated in the instant modified embodiment. In this construction, the member carrying the stuffing box 8 as at 38 is threaded as indicated at 39 so as to receive thereon the similarly threaded retainer nut 41, the latter member being mounted upon the bonnet 4 as indicated to draw up the member 38 in shouldered relation against the bonnet shoulder surface 42, the latter joint being preferably rendered fluid tight by means of the weld seal 43. The upper portion of the retainer nut 41 is grooved as at 44 whereby to provide the annular flange 45 having the inclined surface 46 to receive the split clamp members 23 and 24 snugly as shown more clearly in FIG. 6 to cooperate with the similarly flanged portion 47 and the annular inclined surface 48 of the yoke member 49 whereby to draw the flange portion 47 firmly against the annular surface 51 of the retainer nut 41.

In order to accommodate the gland T-bolts 11, which, in this case, may be provided with square heads as indicated at 52, the yoke 49 is provided with a pair of integrally cast oppositely disposed lugs as at 53 and 54. The said lugs are hollow to provide a recess or chamber as indicated at 55 to receive the square heads 52 of the gland bolts 11. The hollow lugs 53 and 54 are apertured as at 56 and 57 to allow for the projection outwardly of the threaded gland T-bolts 11 to extend through the similarly apertured gland flange 13 and capped by the nuts 12 to effect the desired compression of the stuffing box packing when desired in the usual manner. If it becomes necessary to remove or replenish the packing as described in connection with the other constructions the square head gland bolts can be disassembled upon removal of the clamp halves 23 and 24. Similarly upon assembly, the gland bolts 11 must be placed in position within the respective lugs 53 and 54 before the halves of the clamp are assembled on the valve. In all other respects, the construction is quite similar to that described in connection with the previous figures and hence further description is not deemed to be necessary.

It should be apparent that while a plurality of embodiments have been shown and described with respect to the invention, it will be of course understood that this is for purpose of illustration and not of limitation.

We claim:

1. In a valve construction or the like for supporting an actuating mechanism including a combined bonnet and stuffing box, a stem, a casing, a yoke therefor having a pair of spaced-apart arms, a gland for the stuffing box, means for compressing the packing in the said stuffing box, a bonnet for supporting said yoke, divided clamp means for joining said yoke to the combined bonnet and stuffing box, means for drawing said divided clamp means together, the said yoke and the combined bonnet and stuffing box having oppositely disposed flanges with annularly disposed inclined surfaces for engagement by said divided clamp means, hollow lug means cooperating with said clamp means and said yoke, the said means for compressing the packing in the said combined bonnet and stuffing box comprising a plurality of gland T-bolts mounted exteriorly of said clamp means to engage said hollow lugs and means for drawing said clamp means together.

2. The subject matter of claim 1, means on the combined bonnet and stuffing box for drawing the said yoke to the said bonnet in fixed abutting relation.

3. The subject matter of claim 1, the said combined bonnet and stuffing box having mating annular means cooperating with said yoke for effecting alignment of the said yoke with the said bonnet and stuffing box.

4. The subject matter of claim 1, retainer nut means on the combined bonnet and stuffing box for assembling said stuffing box with the said bonnet, the said hollow lug means cooperating with the said retainer nut means and said bonnet and stuffing box receiving said T-bolts.

5. The subject matter of claim 1, the said combined bonnet and stuffing box having annular means for alignment of the said yoke with the said bonnet and stuffing box, said bonnet and yoke being mounted in abutting relation at said oppositely disposed flanges.

6. The subject matter of claim 1, retainer nut means for drawing said stuffing box to said bonnet in fluid sealing relation.

7. The subject matter of claim 1, the said hollow lug means being integrally mounted on said yoke and being apertured to permit of said gland bolts being removed upon disassembly of said split clamp means.

8. In a valve construction or the like for supporting an actuating mechanism including a combined bonnet and stuffing box, a stem, a casing, a yoke therefor having a pair of spaced-apart arms, a gland for the stuffing box, means for compressing the packing in the said stuffing box, a bonnet for supporting said yoke, divided clamp means for joining said yoke to the combined bonnet and stuffing box, means for drawing said divided clamp means together, the said clamp means having hollow lug means thereon, the said yoke and the combined bonnet and stuffing box having oppositely disposed flanges with annularly disposed inclined surfaces for engagement by said divided clamp means, the said means for compressing the packing in the said combined bonnet and stuffing box comprising a plurality of gland T-bolts engaging said hollow lug means.

References Cited in the file of this patent

UNITED STATES PATENTS

| | | |
|---|---|---|
| 306,230 | Dingle et al. | Oct. 7, 1884 |
| 2,563,012 | Dopp et al. | Aug. 7, 1951 |
| 2,722,401 | Till et al. | Nov. 1, 1955 |